United States Patent [19]

Hammer et al.

[11] Patent Number: 4,543,282
[45] Date of Patent: Sep. 24, 1985

[54] TUBULAR FOOD CASING HAVING IMPROVED PEELING PROPERTIES

[75] Inventors: Klaus-Dieter Hammer, Mainz; Hermann Winter, Wiesbaden; Erwin Kindl, Wiesbaden; Heinz Luchterhand, Wiesbaden, all of Fed. Rep. of Germany

[73] Assignee: Hoechst Aktiengesellschaft, Frankfurt am Main, Fed. Rep. of Germany

[21] Appl. No.: 552,774

[22] Filed: Nov. 17, 1983

[30] Foreign Application Priority Data

Nov. 18, 1982 [DE] Fed. Rep. of Germany ....... 3242655
May 24, 1983 [DE] Fed. Rep. of Germany ....... 3318804

[51] Int. Cl.$^4$ .................. F16L 11/02; A23G 1/00
[52] U.S. Cl. .................... 428/36; 138/118.1; 426/105; 426/140
[58] Field of Search ........ 138/118.1; 428/36; 426/105, 140

[56] References Cited

U.S. PATENT DOCUMENTS

| | | | |
|---|---|---|---|
| 2,136,566 | 10/1938 | Schnecko et al. | 138/118.1 |
| 2,901,358 | 8/1959 | Underwood et al. | 99/176 |
| 2,925,621 | 2/1960 | Parth | 426/105 |
| 3,307,956 | 3/1967 | Chiu et al. | 99/176 |
| 3,451,827 | 6/1969 | Bridgeford | 99/176 |
| 3,558,331 | 1/1971 | Tarika | 99/176 |
| 3,679,435 | 7/1972 | Klenk et al. | 99/176 |
| 3,898,348 | 8/1975 | Chiu et al. | 426/413 |
| 3,988,804 | 11/1976 | Regner et al. | 17/45 |
| 4,137,947 | 2/1979 | Bridgeford | 138/118.1 |
| 4,161,968 | 6/1979 | Rasmossen et al. | 138/118.1 |
| 4,163,463 | 8/1979 | O'Brien | 138/118.1 |
| 4,248,900 | 2/1981 | Hammer et al. | 428/36 |
| 4,357,371 | 11/1982 | Heinrich et al. | 427/238 |
| 4,396,039 | 8/1983 | Klenk et al. | 138/118.1 |
| 4,399,839 | 8/1983 | Hutschenreuter | 428/36 |
| 4,410,011 | 10/1983 | Andrae et al. | 138/118.1 |

FOREIGN PATENT DOCUMENTS 723323 2/1955 United Kingdom.
1201830 8/1970 United Kingdom.

Primary Examiner—John E. Kittle
Assistant Examiner—James J. Seidleck
Attorney, Agent, or Firm—Schwartz, Jeffery, Schwaab, Mack, Blumenthal & Evans

[57] ABSTRACT

Disclosed is a tubular food casing having improved peelability from the stuffing mixture contained therein which comprises a coating applied to the internal surface of the casing which comprises a first component selected from a water-soluble cellulose ether, a starch ether or a combination thereof and a second component comprising a wax. Also disclosed is a process for making this tubular casing and its application with sausage meat products.

26 Claims, No Drawings

TUBULAR FOOD CASING HAVING IMPROVED PEELING PROPERTIES

BACKGROUND OF THE INVENTION

The present invention relates to a tubular food casing based on cellulose having a coating on its inner surface which provides improved peelability properties. Also disclosed is a process for producing this casing. In a preferred embodiment, the food casing is a sausage casing.

A casing of this type is described in Brit. Pat. No. 723,323. In accordance with this printed publication, sausage casings of regenerated cellulose are provided with an internal coating composed of a water-soluble, film-forming carrier substance (starch and cellulose alkyl ether) and a high-molecular aliphatic hydrocarbon (paraffin wax, natural fats or oils), in order to more easily peel the casing from sausage mixtures having particularly strong adhesion properties (blood sausages). This known coating emulsion has the disadvantage that casings provided therewith are easily damaged during the shirring process or cannot be shirred at all. A further disadvantage is that the casing exhibits a tendency to stick to the shirring mandrel when compressed. Yet another disadvantage of this internal coating resides in the difficulty in handling hard paraffin during application to the internal surface of the sausage casing. In order to liquefy the paraffin, it must first be heated to temperatures of between 60°–70° C. prior to application, and then applied while hot. This procedure runs the risk of the sheathing material getting too dry and becoming brittle. Furthermore, the starch and cellulose ethers are not used as releasing agents, but merely as carrier substances, in relatively small amounts.

In order to improve the peelability of small-diameter sausage casings based on cellulose, internal coatings comprised of water soluble starch ethers and triglycerides (U.S. Pat. No. 4,248,900), cellulose ethers and cationic resins (U.S. Pat. No. 4,161,968) or cellulose ethers and castor, mineral or silicone oil (U.S. Pat. No. 3,898,348) have been described more recently.

All of these known sausage casings fall, however, under the category of "small food casings" which have diameters of between 18 and 26 mm and are used for the production and shaping of small-size skinless sausages, for example, of the Vienna type. These casings are, in general, made of cellulose tubings which are not fiber-reinforced and have relatively thin walls. The casings are also referred to as "peel-off casings" because, after stuffing these casings with a collagen-containing sausage mixture, the mixture subsequently forms its own integral sausage skin composed of the coagulated protein substances of the sausage mixture. These casings are then peeled from the integral skin of the sausage. These more recently developed internal coatings serve to facilitate the mechanical removal of the casing from the surface skin of the sausage in the production of sausages which are sold without casings, whereby the mutual adhesion between the casing and the sausage is to be reduced.

For the production of smoked, cylindrically-shaped sausages of medium or large diameter, i.e., between about 35 and 50 mm or between about 50 and 160 mm, respectively, or of smoked curved or ring-shaped sausages, smoke-permeable cellulose sausage casings which have a correspondingly larger diameter and are fiber-reinforced, or curved or ring-shaped, smoke-permeable cellulose sausage casings, so-called ring casings, are used. In general, ring casings have diameters of between about 35 and 55 mm. The composition of the sausage mixtures used for stuffing these casings is completely different from the sausage mixtures commonly used for stuffing peel-off casings, and, therefore, the adhesive forces arising between the sausage mixtures and the casings are completely different.

In the case of medium or large diameter, curved or ring-shaped sausages, such as coarse spreadable uncooked sausage, finely minced pork sausage or blood sausage, the adhesion between sausage mixture and sausage casing is markedly stronger. Using the known internal coatings for peel-off casings, it is impossible to reduce the stronger adhesive forces to a satisfactory degree. If a casing provided with an internal coating of this type is stuffed with meat, for example, coarse spreadable uncooked sausage, finely minced pork sausage or blood sausage, removal of the casing from the sausage composition is very difficult and breakage often occurs due to the insufficient releasing action towards these types of sausage meat. In comparing the coated and uncoated casings, practically no significant improvement in peelability of the coated casing is evidenced.

SUMMARY OF THE INVENTION

It is therefore an object of the present invention to provide a sausage casing having an internal coating which is particularly suitable for medium or large diameter sausage casings and ring casings.

Another object of the present invention is the provision of an internally coated sausage casing which substantially reduces the relatively high adhesion between the casing and the sausage mixture envisaged for the medium or large diameter sausage casings and ring casings.

Yet another object of the present invention is the provision of an internally coated sausage casing which exhibits an increased releasing action, so that the sausage casing can be peeled from the sausage product with relative ease and which practically removes the danger that the sausage casing may break while being peeled from the sausage mixture.

A further object of the present invention is to provide a sausage casing having an internal coating exhibiting an increased releasing action, while maintaining good sliding and plasticizing properties.

In addition, another object is the provision of such an internal coating which does not lead to an embrittlement of the casing material.

A still further object of the invention is the provision of an internally coated sausage casing which exhibits advantageous peeling properties and results in problem-free shirring and processing of stuffed products.

It is another object of the present invention to provide a process for the production of a sausage casing of the above type.

In accomplishing the foregoing objects, there has been provided in accordance with one aspect of the present invention, a tubular food casing having improved peelability properties for removing the casing from the food product contained therein, which comprises a support comprising cellulose, and a coating applied to the inside surface of the support comprising a homogeneous mixture which includes a first component selected from a water-soluble cellulose ether, a starch ether or combination thereof, and a second component comprising a wax, wherein the quantity by weight of the second component is less than about one-half the quantity by weight of the first component.

In a preferred embodiment, the coating further comprises a third component selected from a non-reactive silicone oil, a vegetable oil or a mixture thereof.

In accordance with another aspect of the present invention, there has been provided a process for coating the inside surface of a tubular food casing, comprising the steps of providing an aqueous solution of a first component comprising from about 10 to 200 g of water-soluble cellulose ether, starch ether or a combination thereof, adding a second component of a wax in the form of an about 15 to 40 wt % aqueous dispersion, mixing the components to form a coating mixture, and applying the mixture to the inside surface of the tubular casing.

In a preferred embodiment of this aspect, the process further comprises the step of adding a third component selected from a silicone oil, a vegetable oil or a combination thereof in the form of an about 25 to 60 wt % aqueous emulsion.

The food casing of the present invention, having the special coating on its internal surface, shows a reduced adhesion between the inner wall of the casing and a stuffing mixture of the type which is typically used for stuffing medium and large diameter casings and ring casings. In particular, the casing is applicable with sausage meat of the type used for various types of blood sausages, cooked sausages, such as slightly smoked sausage, smoked ham sausage, minced pork sausage, mortadella, yellow-skin sausage or Lyon sausage, or uncooked sausages, such as spreadable uncooked pork sausages, whereby in the production of the latter, curved or ring-shaped casings without fiber-reinforcement are preferably employed.

DETAILED DESCRIPTION OF PREFERRED EMBODIMENTS

The food casing according to the present invention is comprised of a support tubing based on cellulose and a coating applied to the inner wall of the casing for improving the peelability of the casing from the sausage meat.

The base material for the support tubing is cellulose, e.g. transparent cellulose film, regenerated cellulose, cellulose hydrate, which is produced as a seamless tubing in known manner, by coagulating and regenerating, preferably from a viscose solution. It is also possible to use a tubing having a glued seam, which is obtained by folding a web and bonding the edges (U.S. Pat. No. 4,410,011 and No. 4,396,039). For the particularly advantageous use of the casing in the production of sausages of the blood sausage or cooked sausage type, a support tubing of fiber-reinforced cellulose is used, for example, in the form of a paper web which is embedded in the wall of the support tubing. Curved or ring-shaped support tubings, so-called ring casings, which are not fiber-reinforced, are used for the production of curved or ring-shaped sausages, such as uncooked sausages and, in particular, coarse spreadable uncooked pork sausages. The curvature is, for example, obtained by stretching only one side of the tubing during its production. Other methods are also known and described in U.S. Pat. No. 2,136,566, No. 2,925,621, No. 3,679,435 and No. 4,410,011.

Apart from the coating according to the present invention, no additional internal coating of the casing is envisaged. If the external surface of the casing is to be provided with a coating, care must be taken not to substantially reduce the smoke-permeability of the casing.

For stuffing with a stuffing material, the food casing may be used as a laid-flat tubing which is wound onto a roll or as tube sections which are closed at one end. It is also possible to form shirred tubular casings, so-called concertinas, by means of conventional shirring devices, for example, see U.S. Pat. No. 3,988,804. In so doing, it has been found that the internal coating according to the invention not only facilitates the removal of the stuffing material from the inner wall of the casing, but also achieves additional advantages with regard to winding-up, storing, shirring and processing. For example, the internal coating ensures that the tubings wound onto a roll do not become tacky or stick together. Also, tube sections do not stick together during storing and can be easily opened for stuffing. Furthermore, the tubings possess particularly good sliding properties and smoothness and, therefore, can be shirred in a problem-free manner.

The coating which is applied to the inner surface of the food casing includes two components. The first component comprises a water-soluble cellulose ether and/or starch ether. Typical suitable cellulose ethers or starch ethers are: carboxymethyl cellulose and carboxymethyl starch and the sodium salts thereof, alkyl ethers, such as methyl or ethyl cellulose, methyl or ethyl starch, hydroxyalkyl ethers, such as hydroxyethyl or hydroxypropyl cellulose, hydroxyethyl or hydroxypropyl starch, alkyl-hydroxyalkyl ethers, such as methyl- or ethyl-hydroxyethyl cellulose or methyl- or ethyl-hydroxypropyl cellulose and the corresponding starch ethers, alkyl-carboxymethyl ethers, hydroxyalkyl-carboxymethyl ethers and alkyl-hydroxyalkyl-carboxymethyl ethers. The term "water-soluble" also includes the meaning of "alkali-soluble".

Low-molecular weight types of cellulose ethers or starch ethers are particularly preferred, which are, for example, commercially available under the trademark of TYLOSE C 10, C 20, C 30, H 10, H 20, H 30, MH 10, MH 20, and MH 30 and which yield aqueous solutions of low viscosity even when present in relatively high concentrations. The letter C denotes carboxymethyl cellulose, the letter H denotes hydroxyethyl cellulose and the letters MH denote methyl-hydroxyethyl cellulose. The numbers 10, 20 and 30 indicate the average viscosity of the cellulose ethers in mPa.s, determined according to Hoeppler in a 2% by weight strength aqueous solution at 20° C. The applied quantity of cellulose ether or starch ether varies between about 0.05 and 1, preferably between about 0.1 and 0.5 g/m² of tubing surface.

The second component of the coating is a wax, for example, a vegetable wax, such as candelilla wax, carnauba wax or montan wax, an animal wax, such as beeswax, a mineral wax, such as a polyolefin wax composed of n- and iso-paraffins, or a synthetic wax which may, for example, be based on oxazoline.

It has been found that the most suitable waxes are those with functional groups, the main component of which is a mixture of esters of linear aliphatic alcohols and linear higher fatty acids, the fatty acids preferably having chain lengths of between about 18 and 34 carbon atoms. The alcohol component predominantly is a monohydric alcohol, polyhydric alcohols with free OH-groups are present to a very limited extent. The linear higher fatty acids also include long-chain hydroxy-carboxylic acids and dicarboxylic acids. In particular, candelilla wax, carnauba wax, beeswax and montan wax are included in this group of waxes.

Chemically modified montan wax is an especially suitable wax with functional groups, which is, for example, commercially available as so-called "acid wax" or "ester wax". Chemically modified montan wax is obtained by oxidizing raw, resin-free montan wax, for example, with cromosulphuric acid. During this bleaching process the black-brown resin and asphalt substances contained in the wax are disintegrated and removed. The wax alcohol esters are cleaved, the freed wax alcohols are oxidized to give wax acids, and hydroxy acids and diols which are present are oxidized to give dicarboxylic acids. To a small extent, the wax esters are also cleaved hydrolytically and converted into wax acids. All of the acid groups of this so-called "acid wax" variety are then esterfied with mono- or polyhydric alcohols, for example, with ethylene glycol and 1,3-butylene glycol (1:1) (type KPS, made by Hoechst), to obtain an "ester wax". In accordance with the present invention, the chemically modified montan wax may be employed in the form of either an "acid wax" or an "ester wax". The original wax structure of long-chain, aliphatic compounds is substantially maintained in the chemically modified montan wax.

Waxes with functional groups, in particular chemically modified montan wax, lead to an especially improved peelability of the cellulose food casing. This improved action could result from the fact that the ester units with their functional groups possibly add to the cellulose chains whereby hydrogen bridges may form between the functional groups of the ester units and the cellulose.

The portion of the wax component contained in the coating composition and in the applied coating is small compared with the portions of cellulose ether and starch ether. This amount can be even less than about one-half and as little as about 1/20 of the amount of cellulose ether and starch ether.

In a further embodiment, the internal coating of the food casing includes a third component comprised of silicone oil, vegetable oil or a mixture of the two.

In contrast to other proposed components, for example, see, U.S. Pat. No. 3,307,956 and No. 3,558,331, the silicone oil is no longer reactive or polymerizable, nor does it harden or react in any other way. Above all, it is a dialkyl polysiloxane, in particular dimethyl polysiloxane types of medium viscosity being preferred. The term "types of medium viscosity" herein denotes silicone oils which have the same viscosity in a 40% by weight strength aqueous emulsion as, for example, the Wacker-Chemie products which are commercially available under the name of SILICONOEL-EMULSION (silicone oil emulsion) E 2, E 10 and E 115.

Particularly preferred vegetable oils are linseed oil, olive oil, sunflower oil, rape oil, palm oil and coconut oil. Vegtable oils, in particular, also include synthetically produced triglyceride mixtures of vegetable fatty acids, which are, for example, available under the trade names MIGLYOL or SOFTENOL (made by Dynamit Nobel). Suitable triglyceride mixtures contain esterified saturated fatty acids having chain lengths of about 4 to 12, preferably about 5 to 10, carbon atoms. In accordance with this invention, mixtures of the above-mentioned oils are also to be understood as vegetable oils.

If a mixture of silicone oil and vegetable oil is used, the quantitative ratio should preferably be selected such that the amount of vegetable oil is equal to or up to about 3 times the amount of silicone oil. It should be observed that in case of a very low amount of silicone oil the amount of wax will have to be increased.

If the third component is silicone oil or vegetable oil individually, the amount of silicone oil or vegetable oil in the coating composition and in the applied coating usually varies between about 15 and 60%, relative to the weight of the first component; the amount of silicone is about 1.5 to 5 times higher and the amount of vegetable oil is about 0.5 to 0.9 times higher, than the weight amount of the second component.

If the third component is instead a mixture of silicone oil and vegetable oil, the weight amount of vegetable oil is advantageously greater and amounts to about 15 to 80% of the weight amount of the first component, and about 1.5-fold to 10-fold of the weight amount of the second component. The amount of silicone oil contained in the mixture remains within the above-stated range.

The process of the invention is based on a conventional process for the preparation of cellulose-type food casings, which can easily be peeled from their contents, which preferably comprise sausage mixtures.

The application of the internal coating to the inside surface of the tubular casing is performed in a known manner, for example, by filling the tubular casing with a coating liquid (British Pat. No. 1,201,830, U.S. Pat. No. 2,901,358 and No. 4,357,371) or by spraying the coating liquid onto the inside surface of the tubular casing during the shirring process, for example, through the hollow shirring mandrel (U.S. Pat. No. 3,451,827). The application temperature usually corresponds to the ambient temperature, i.e., is variable between about 15° and 30° C.

Filling of the tubular casing with the coating liquid advantageously takes place during the production of the tubular casing, for example, after precipitation of the cellulose hydrate gel from viscose and before drying.

One liter of the aqueous coating composition to be applied to the inside surface of the food casing contains about 10 to 200 g, in particular, about 30 to 60 g of water-soluble cellulose ether and/or starch ether, dispersed wax as the second component, and optionally silicone oil and/or vegetable oil, in the quantitative ratios given above. In the preparation of the coating liquid, the wax is usually added to the aqueous solution of cellulose or starch ether in the form of an about 15–40% by weight strength aqueous dispersion, and the third component is added in the form of an about 25–60% by weight strength aqueous emulsion. Moreover, the coating liquid may contain the usual amounts of plasticizers, such as glycerol or propylene glycol. The components are well mixed, for example, by agitating, so that an aqueous mixture possessing maximum stability is obtained.

The composition of the coating liquid, i.e., the quantitative ratios of the individual components, is adapted to the type of casing and stuffing material used in each case. For the internal coating of ring casings made of non-fiber-reinforced cellulose which are intended for the production of uncooked sausages, such as, in particular, spreadable uncooked pork sausage, there is, for example, proposed an aqueous solution which per liter contains about 20 to 65 g of low-molecular weight cellulose ether or starch ether, in particular low-molecular weight hydroxyethyl cellulose (for example, TYLOSE H 10), as the first component; about 3 to 30 g of chemically modified montan wax (for example, of the KPS type) as the second component; and about 10 to 45 g of a non-reactive silicone oil based on dimethyl polysiloxane (for example, of the E 2 type) and/or about 10 to 50 g of a synthetic triglyceride with esterified $C_5$ to $C_{10}$ fatty acids (for example, SOFTENOL) as the third component. In this solution, the weight amount of wax, silicone oil and triglyceride is in each case smaller than the weight amount of the first component.

If the third component is silicone oil or a mixture of silicone oil and triglyceride, its weight amount is greater than the weight amount of wax. In these two cases it is of particular advantage if the weight amount of silicone oil is about 1.5 to 5 times higher than the weight amount of wax, and the weight amount of triglyceride is about 1.5 to 10 times higher than the weight amount of wax.

If, however, the third component is comprised of triglyceride alone, then the weight amount of wax in the internal coating, which is required for sausage casings intended for uncooked sausages, must be higher than the amount of triglyceride, and preferably, it is between about 10 and 100% higher than the amount of triglyceride, relative to the weight of this third component. Relative to the weight of the first component, the amount of wax then is between about 30 and 70%.

The above-described preferred internal coating of the ring casing for uncooked sausages thus comprises, relative to the amount of cellulose ether or starch ether, about 5 to 60% by weight of wax and about 17 to 120% by weight of the third component, the quantitative ratios in the applied coating approximately corresponding to the quantitative ratios in the coating liquid. It is clear that, apart from the main components, the internal coating also contains an emulsifier comprised of an emulsion of the third component.

The invention will now be explained in greater detail by reference to the following nonlimiting example, in which nine ring casings with different coatings are prepared.

EXAMPLE

The aqueous coating liquids used in the example are each prepared by dissolving hydroxyethyl cellulose (TYLOSE H 10, made by Hoechst) in water, mixing the solution thus obtained with a 20% by weight strength dispersion of chemically modified montan wax (type KPS, made by Hoechst) while agitating, and optionally also with a 40% by weight emulsion based on dimethyl polysiloxane (type E 2, made by Wacker-Chemie) and/or with a 50% by weight emulsion based on vegetable oil (triglyceride based on saturated $C_5$ to $C_{10}$ fatty acids, SOFTENOL-SPEZIALOEL, made by Dynamit Nobel). Furthermore, glycerol and water are added, in an amount such that the coating liquid contains about 10% by volume of glycerol. The quantities of the three mentioned main components, which have to be mixed with each other to obtain 1 liter of coating liquid, are compiled in the table below.

In each case, a ring casing of non-fiber-reinforced cellulose hydrate is produced, which has a diameter of 43 mm. For this purpose, viscose is coagulated into a tubular shape and converted into cellulose hydrate gel in a conventional manner, whereby the typical, curved ring shape is imparted to the casing by special, customary stretching processes. Before the curved tube of cellulose hydrate gel is dried, it is filled with about 1.5 liter of the respective coating liquid and then coated and dried as described in British Pat. No. 1,201,830. The drying temperature is about 80° C. to 150° C., the residence time in the drying device is about 2 to 6 minutes. After leaving the drying device, the internally coated tube is remoistened to a moisture content of between about 7 and 12%, and wound up.

Sections of a length of about 40 cm are stuffed with sausage meat of the coarse spreadable uncooked pork sausage type. After smoking of the sausages, the casings can be peeled from the sausage meat without the occurrence of breakage or adhesion of the casing to the sausage meat. Casings No. 2 to 7 have optimum properties, whereas the adhesion between the sausage meat and casing No. 1 is slightly stronger. The adhesion properties of sausage casings No. 8 and No. 9 are between those of casing No. 1 and casings No. 2 to 7.

TABLE

| ring casing | 1 | 2 | 3 | 4 | 5 | 6 | 7 | 8 | 9 |
|---|---|---|---|---|---|---|---|---|---|
| cellulose ether (g) | 50 | 50 | 50 | 40 | 50 | 50 | 50 | 50 | 50 |
| dissolved in water (ml) | 650 | 500 | 500 | 500 | 760 | 730 | 705 | 720 | 695 |
| silicone oil emulsion (ml) | — | 37,5 | 37,5 | 50 | 37,5 | 37,5 | 37,5 | — | — |
| dry content (g) | — | 15 | 15 | 20 | 15 | 15 | 15 | — | — |
| triglyceride emulsion (ml) | — | — | — | — | 30 | 60 | 80 | 30 | 30 |
| dry content (g) | — | — | — | — | 15 | 30 | 40 | 15 | 15 |
| wax dispersion (ml) | 100 | 25 | 75 | 50 | 25 | 25 | 25 | 100 | 125 |
| solids content (g) | 20 | 5 | 15 | 10 | 5 | 5 | 5 | 20 | 25 |

What is claimed is:

1. A tubular ring-shaped, medium or large diameter sausage casing having improved peelability properties for removing the casing from the food product contained therein, comprising:
   a support comprising cellulose for forming a ring-shaped, medium or large diameter sausage casing, and
   a coating applied to the inside surface of the support comprising a homogeneous mixture which includes:
   a first component selected from a water-soluble cellulose ether, a starch ether or combination thereof, and
   a second component selected from a wax, wherein the quantity by weight of said second component is less than about one-half the quantity by weight of said first component.

2. A casing as defined in claim 1, wherein said wax includes at least one functional group, the main constituent of said at least one functional group comprising a mixture of esters of linear aliphatic alcohols and linear higher molecular weight fatty acids.

3. A casing as defined in claim 2, wherein said fatty acids have a chain length of between about 18 and 34 carbon atoms.

4. A casing as defined in claim 1, wherein said wax comprises montan wax, candelilla wax, carnauba wax or beeswax.

5. A casing as defined in claim 4, wherein said wax comprises chemically modified montan wax.

6. A casing as defined in claim 1, wherein the weight ratio of said first component to said second component is greater than about 2:1 and is equal to or less than about 20:1.

7. A casing as defined in claim 1, wherein said coating further comprises a third component selected from a non-reactive silicone oil, a vegetable oil or a mixture thereof.

8. A casing as defined in claim 7, wherein said third component comprises a non-reactive silicone oil in an amount by weight smaller than said first component and equal to or greater than said second component.

9. A casing as defined in claim 8, wherein said silicone oil is present in an amount by weight from about 15 to 60% relative to said first component and up to 5 times the amount by weight of said second component.

10. A casing as defined in claim 7, wherein said third component comprises a vegetable oil in an amount by weight smaller than said first and second components.

11. A casing as defined in claim 10, wherein said vegetable oil is present in an amount by weight of from about 15 to 60%, relative to said first component, and from about 50 to 90% relative to said second component.

12. A casing as defined in claim 7, wherein said third component comprises a mixture of a non-reactive silicone oil and a vegetable oil, wherein the amount by weight of each of said silicone oil and vegetable oil is smaller than the amount by weight of said first component and greater than the amount by weight of said second component.

13. A casing as defined in claim 12, wherein the amount by weight of said silicone oil is from about 15 to 60% and the amount by weight of said vegetable oil is from about 15 to 80% of the amount by weight of said first component.

14. A casing as defined in claim 12, wherein the amount by weight of said silicone oil is less than or equal to 5 times and the amount by weight of said vegetable oil is less than or equal to 10 times the amount by weight of said second component.

15. A casing as defined in claim 7, wherein said coating has a weight per unit area from about 0.2 to 3 $g/m^2$.

16. A casing as defined in claim 15, wherein said coating has a weight per unit area from about 0.3 to 1 $g/m^2$.

17. A casing as defined in claim 1, wherein said support includes a fiber reinforcement.

18. A casing as defined in claim 1, wherein the diameter of the casing ranges from about 35 to 160 mm.

19. A casing as defined in claim 18, wherein the diameter of the casing ranges from about 35 to 50 mm.

20. A casing as defined in claim 18, wherein the diameter of the casing ranges from about 50 and 160 mm.

21. a casing as defined in claim 1, wherein the casing has a curved or ring-like shape.

22. A tubular sausage casing comprising a casing as defined in claim 1.

23. A process for producing a tubular food casing having a coating on the inside surface of the casing which exhibits improved peelability properties, comprising the steps of:
   providing an aqueous solution of a first component comprising from about 10 to 200 g of water-soluble cellulose ether, starch ether or a combination thereof;
   adding a second component of a wax in the form of an about 15 to 40 wt % aqueous dispersion;
   mixing said components to form a coating mixture; and
   applying said mixture to the inside surface of the tubular casing.

24. A process as defined in claim 23, further comprising the step of adding a third component selected from a silicone oil, a vegetable oil or a combination thereof in the form of an about 25 to 60 wt % aqueous emulsion.

25. A tubular ring-shaped, medium or large diameter sausage casing having improved peelability properties for removing the casing from the food product contained therein, comprising:
   a support comprising cellulose for forming a ring-shaped, medium or large diameter sausage casing, and
   a coating applied to the inside surface of the support comprising a homogeneous mixture which includes:
      a first component selected from a water-soluble cellulose ether, a starch ether or combination thereof,
      a second component selected from a wax, wherein the quantity by weight of said second component is less than about one-half the quantity by weight of said first component, and
      a third component selected from a non-reactive silicone oil, a vegetable oil or a mixture thereof.

26. A tubular ring-shaped, medium or large diameter sausage casing having improved peelability properties for removing the casing from the food product contained therein, comprising:
   a support comprising cellulose for forming a ring-shaped, medium or large diameter sausage casing, and
   a coating applied to the inside surface of the support comprising a homogeneous mixture which includes:
      a first component selected from a water-soluble cellulose ether, a starch ether or combination thereof, and
      a second component selected from a wax, wherein the quantity by weight of said second component is less than about one-half the quantity by weight of said first component,
   wherein the diameter of the casing ranges from about 35 to 160 mm.

* * * * *